United States Patent
Garry

(10) Patent No.: US 10,363,607 B2
(45) Date of Patent: Jul. 30, 2019

(54) ADDITIVE LAYER MANUFACTURING

(71) Applicant: ROLLS-ROYCE plc, London (GB)

(72) Inventor: Ian M. Garry, Thurcaston (GB)

(73) Assignee: ROLLS-ROYCE plc, London (GB)

( * ) Notice: Subject to any disclaimer, the term of this patent is extended or adjusted under 35 U.S.C. 154(b) by 314 days.

(21) Appl. No.: 15/420,975

(22) Filed: Jan. 31, 2017

(65) Prior Publication Data

US 2017/0246689 A1     Aug. 31, 2017

(30) Foreign Application Priority Data

Feb. 26, 2016   (GB) .................................. 1603351.6

(51) Int. Cl.
| | |
|---|---|
| *B22F 7/02* | (2006.01) |
| *B22F 3/105* | (2006.01) |
| *B29C 64/153* | (2017.01) |
| *B33Y 10/00* | (2015.01) |
| *B23K 26/342* | (2014.01) |
| *B23K 26/00* | (2014.01) |
| *B28B 1/00* | (2006.01) |
| *B23K 103/16* | (2006.01) |

(52) U.S. Cl.
CPC .............. *B22F 7/02* (2013.01); *B22F 3/1055* (2013.01); *B23K 26/0006* (2013.01); *B23K 26/342* (2015.10); *B28B 1/001* (2013.01); *B29C 64/153* (2017.08); *B33Y 10/00* (2014.12); *B22F 2998/10* (2013.01); *B23K 2103/172* (2018.08); *Y02P 10/295* (2015.11)

(58) Field of Classification Search
CPC .................................. B22F 7/02; B33Y 10/00
USPC ........................................................... 419/7
See application file for complete search history.

(56) References Cited

U.S. PATENT DOCUMENTS

| | | |
|---|---|---|
| 2011/0072660 A1 | 3/2011 | Flesch et al. |
| 2015/0003997 A1 | 1/2015 | Mironets et al. |
| 2015/0314530 A1 | 11/2015 | Rogren |

FOREIGN PATENT DOCUMENTS

| | | |
|---|---|---|
| CN | 101713021 A | 5/2010 |
| CN | 104531980 A | 4/2015 |
| CN | 103352195 B | 8/2015 |

(Continued)

OTHER PUBLICATIONS

Jul. 18, 2017 Search report issued in European Patent Application No. 17153934.

(Continued)

*Primary Examiner* — Weiping Zhu
(74) *Attorney, Agent, or Firm* — Oliff PLC

(57) ABSTRACT

A method for the manufacture of a component of defined geometry from two or more materials using a powder bed ALM process includes providing a bed of a first powdered material, selectively fusing portions of the first powdered material to build up a first three dimensional portion of the component geometry and fusing a powder containment bund from the first material to contain unfused first powdered material. A bed of a second powdered material is deposited onto the powder containment bund and selectively fused to build up a second three dimensional portion of the component geometry. Unfused first powdered material can subsequently be removed from a first side of the bund and unfused second powder from a second side of the bund. Remaining parts of the bund which do not form part of the defined geometry of the component can be removed to provide the net shape component.

10 Claims, 4 Drawing Sheets

(56) References Cited

FOREIGN PATENT DOCUMENTS

| EP | 3034225 A1 | 6/2016 |
|---|---|---|
| WO | 2015/075539 A1 | 5/2015 |

OTHER PUBLICATIONS

May 27, 2016 Search Report issued in Great Britain Application No. 1603351.6.

ADDITIVE LAYER MANUFACTURING

TECHNICAL FIELD

The present invention is related to additive layer manufacturing (ALM) methods, more particularly to such methods wherein selected regions within a mass of powdered material are processed across a number of sequential layers to cause local solidification of the material and build up a three dimensional solid object within the mass of powder.

BACKGROUND TO THE INVENTION

A powder bed ALM process starts with a bed of powdered material such as a ceramic, a ferrous alloy or a non-ferrous alloy. Regions within the powder mass are selectively treated, for example by melting or sintering, to solidify. The untreated powder remains in a layer as the next layer is formed. Surplus (untreated) material may be removed when the three dimensional build is complete and can be recycled.

The nature of powder bed ALM permits that a component can be constructed from multiple powdered materials, however, this is not currently a practical option. Firstly, the changeover of a powder type inside an ALM machine is a lengthy processes adding to the overall cost of the component manufacture. Secondly, since the addition of a second powder contaminates a first powder, re-cycling of any untreated powders is near impossible. Materials used are a high value commodity and wastage is desirably minimised. As a consequence powder bed ALM parts are currently engineered to be built in a single material.

SUMMARY OF THE INVENTION

In accordance with the present invention there is provided a method for the manufacture of a component of defined geometry from two or more materials using a powder bed ALM process, the method comprising;

providing a bed of a first powdered material, selectively fusing portions of the first powdered material to build up a first three dimensional portion of the component geometry, fusing a powder containment bund from the first material whereby to contain unfused first powdered material, providing a bed of a second powdered material onto the powder containment bund and selectively fusing portions of the second powdered material to build up a second three dimensional portion of the component geometry, removing unfused first powdered material from a first side of the bund and removing unfused second powder from a second side of the bund, removing parts of the bund which do not form part of the defined geometry of the component.

The beds of first and second powdered material may be stacked with a containment bund wall therebetween. The bund wall may be planar and extend in parallel with a planar base plate on which the component is built. The bund wall may be planar and inclined to a base plate. Alternatively, the bund wall may be curved or angled. Alternatively the first and second powdered material beds may be nested, the second powder deposited around a multi-sided containment vessel of the first powdered material such that an interface between the first and second materials is created in multiple, non-parallel planes.

In a simple embodiment, the containment bund comprises a single separating wall extending across a top layer of fused first powdered material. In more complex embodiments, the containment bund comprises perimeter walls extending substantially orthogonally to the separating wall. The perimeter walls may be fused from one or both of the first and second powdered materials to provide, with the separating wall, containment vessels for containing a single one of the first and second powdered materials. It will be appreciated the vessels may be arranged back to back, a single separating wall forming a wall of each of two vessels.

It will be understood that principles of the invention can be extended to more than two powders or to alternate layers of two or more powders.

As indicated, the bed of a first powdered material may be laid directly onto a base plate of an ALM machine. In this case, access to the unfused powder may be obtained by removing the base plate. In alternative arrangements access to unfused first powdered material may be obtained by penetrating a perimeter wall of a containment bund. This provides that the bed of first powdered material may be deposited onto an already existing bund separating wall, or a support structure, or an already built portion of the component. Thus the invention can be applicable to use of more than two different materials and/or alternate layering of materials. Where unfused powder becomes sandwiched between two separating walls and has a perimeter wall, the perimeter wall can be penetrated to allow access to the sandwiched unfused powder.

In simple arrangements, unfused powder may be removed by pouring of powder through an opening provided in the containment bund. In other arrangements, suction may be used to remove and collect unfused powder.

BRIEF DESCRIPTION OF FIGURES

Embodiments of the invention will now be further described with reference to the accompanying Figures in which.

DETAILED DESCRIPTION OF FIGURES AND EMBODIMENTS

Figure 1:
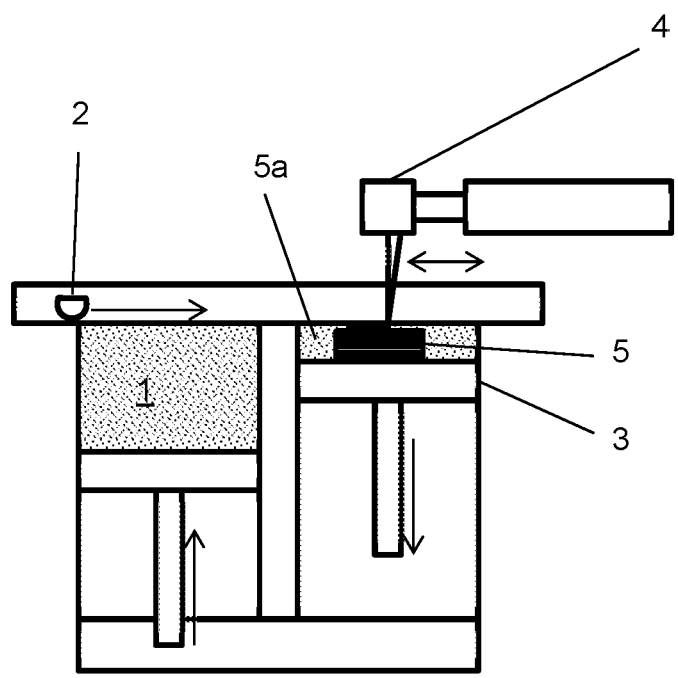
FIG. 1 is a schematic showing apparatus for a powder bed ALM process and a component being formed therein as is known from the prior art.

As shown in FIG. 1, a powder bed 1 is raised into the path of a spreading device 2 which spreads a thin layer of powder across a base-plate 3. The base-plate typically comprises a tool steel. Selected regions of the powder corresponding to a shape which it is intended to build are fused together (and also to the base-plate) by heat from a laser 4. The laser 4 is arranged to scan in two dimensions within a plane parallel to that in which the base plate extends. The base-plate 3 is gradually lowered with respect to the laser 4 during the process enabling layer upon layer of powder to be applied and sintered by the laser resulting in a three-dimensional build. This layering process can create one or more components 5 simultaneously. Unfused powder 5a remains on the base plate around the component 5.

In methods in accordance with the invention, a bund wall may be built in parallel with the base plate 3 enclosing the unfused powder 5a. The material of the powder 1 can then be changed to a second powder and the bed of second powder laid onto the bund wall.

Figure 2:
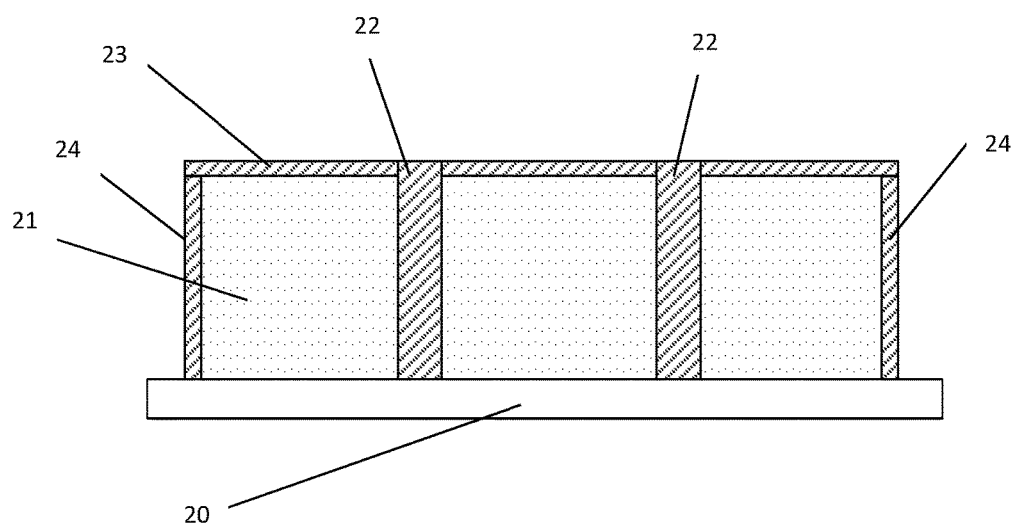
FIG. 2 shows a first step in accordance with a method of the invention.

FIG. 2 shows a first step in a method in accordance with the invention. A bed of a first powder 21 is deposited on a base plate 20 of an ALM apparatus. A defined component geometry 22 is gradually built by selectively fusing regions of the powder bed. In addition, a bund is formed to contain the unfused powder 21. The bund shown is made up from a separating wall 23 and a perimeter wall 24. The perimeter wall may comprise any convenient shape and is optional. The component geometry 22 is integrally formed with the bund separating wall 23.

Figure 3:
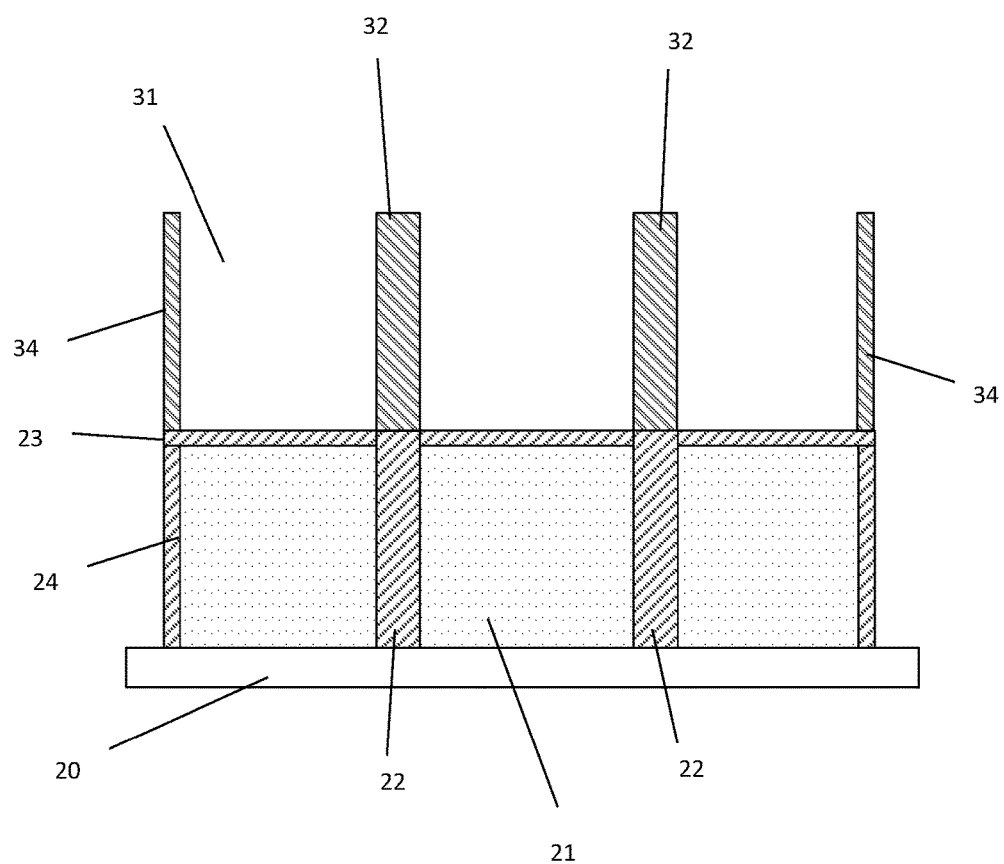
FIG. 3 shows a second step in accordance with a method of the invention.

FIG. 3 shows a subsequent step of a method in accordance with the invention which follows the step of FIG. 2. As can be seen in FIG. 3, a bed of a second powder 31 is deposited on top of the separating wall 23. The defined component geometry 22 is gradually added to by selectively fusing regions of the second powder bed resulting in component geometry portions 32 which are integrally formed with the component geometry portions 22. Additionally, a second perimeter wall 34 is formed to contain the unfused second powder 31.

Figure 4:
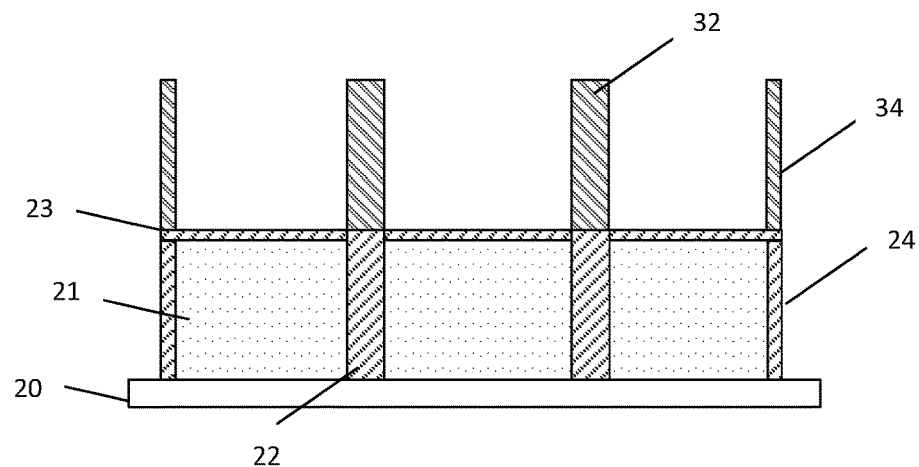
FIG. 4 shows a third step in accordance with a method of the invention.

Once build of the component geometry has been completed, unfused second powder 31 can be removed from a bund defined by the separating wall 23 and perimeter wall 34. For example, a pump could be used to suck out the unfused second powder 31. Alternatively, the base plate 20 on which the build stands could be upturned allowing the unfused second powder 31 to be poured out. The result of this step is shown in FIG. 4.

Figure 5:
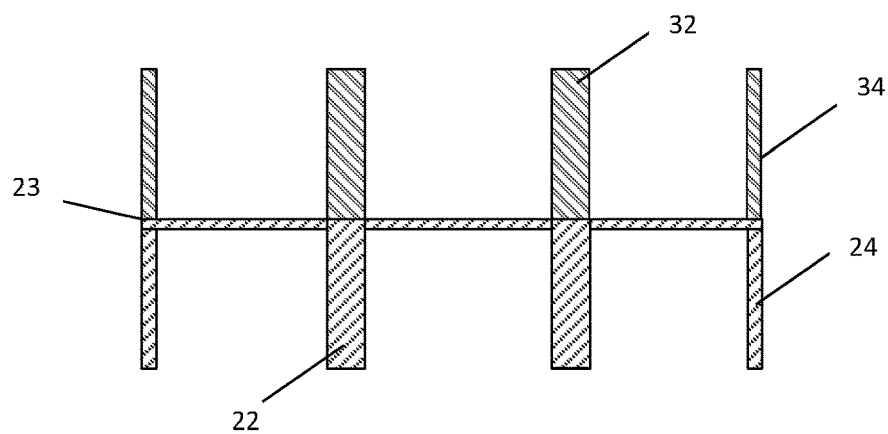
FIG. 5 shows a fourth step in accordance with a method of the invention.
Figure 6:
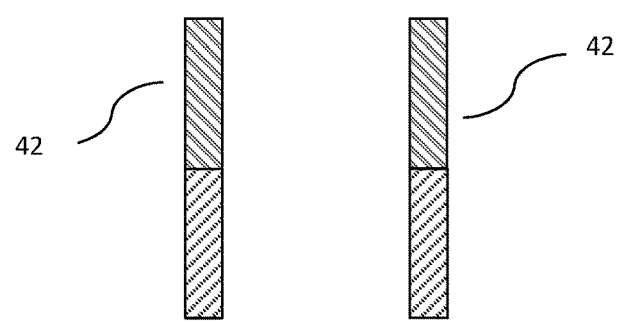
FIG. 6 shows end products manufactured according to the method of FIGS. 2, 3, 4 and 5.

Once the unfused second powder 31 has been removed for recycling, the base plate 20 can be removed allowing the unfused first powder 21 to be removed for recycling. The result of this step is shown in FIG. 5. As can be seen, this comprises integrally formed bund walls 23, 24 and 34 and two material component geometries 22, 32. All parts of the bund wall 23 which do not also form part of the component geometry 22 are then removed. The result of this step is shown in FIG. 6. As can be seen, all that remains is component geometry 42.

The invention claimed is:

1. A method for the manufacture of a component of defined geometry from two or more materials using a powder bed ALM process, the method comprising:

providing a bed of a first powdered material, selectively fusing portions of the first powdered material to build up a first three dimensional portion of the component geometry, fusing, from the first powdered material, a powder containment bund comprising a single separating wall separating the first powdered material completely from a second powdered material whereby to contain unfused first powdered material, providing a bed of the second powdered material onto the powder containment bund and selectively fusing portions of the second powdered material to build up a second three dimensional portion of the component geometry, removing unfused first powdered material from a first side of the containment bund and removing unfused second powder from a second side of the containment bund, and subsequently removing parts of the containment bund which do not form part of the defined geometry of the component.

2. A method as claimed in claim 1 wherein the containment bund further comprises one or more perimeter walls integrally formed with the separating wall.

3. A method as claimed in claim 2 wherein the perimeter wall or walls extend orthogonally with respect to the separating wall.

4. A method as claimed in claim 3 comprising a perimeter wall formed from fused first powdered material.

5. A method as claimed in claim 2 comprising a perimeter wall formed from fused second powdered material.

6. A method as claimed in claim 2 wherein the or each perimeter wall is arranged with respect to the separating wall to provide one or more containment vessels, the containment vessels each containing just one of the first and second powdered materials.

7. A method as claimed in claim 6 wherein one containment vessel is nested inside another.

8. A method as claimed in claim 6 wherein two containment vessels share a separating wall and perimeter walls extend from opposite sides of the separating wall.

9. A method as claimed in claim 1 wherein the bed of first powdered material is laid on a base plate of an ALM apparatus.

10. A method as claimed in claim 1 wherein the bed of first powdered material is laid on an already existing containment bund separating wall, or a support structure built for the component, or an already built portion of the component.

* * * * *